United States Patent [19]

Shemer

[11] 4,238,515

[45] Dec. 9, 1980

[54] NOVEL PHYSICAL FORM OF GLUTEN, METHOD FOR ITS MANUFACTURING AND ITS USES

[75] Inventor: Michael Shemer, Haifa, Israel

[73] Assignee: Pedco Proteins and Enzymes Development Co. Ltd., Petah-Tiqwa, Israel

[21] Appl. No.: 12,403

[22] Filed: Feb. 15, 1979

[30] Foreign Application Priority Data

Feb. 22, 1978 [IL] Israel .................................... 54096

[51] Int. Cl.$^3$ .............................................. A23J 3/00
[52] U.S. Cl. ................................... 426/104; 426/641; 426/646; 426/656; 426/802
[58] Field of Search ............... 426/656, 104, 802, 646, 426/641

[56] References Cited

U.S. PATENT DOCUMENTS

| 3,900,576 | 8/1975 | Schulz ............................. 426/656 X |
| 4,018,936 | 4/1977 | Garbutt et al. ...................... 426/656 |
| 4,125,630 | 11/1978 | Orthoefer ........................ 426/802 X |

FOREIGN PATENT DOCUMENTS

| 4532219 | 4/1967 | Japan ...................................... 426/656 |
| 977239 | 12/1964 | United Kingdom ..................... 426/802 |

OTHER PUBLICATIONS

Carlson, W. A. et al. "Functional Properties of Vital Gluten", Food Technology, Nov. 1958, pp. 629–632.

*Primary Examiner*—Robert A. Yoncoskie
*Attorney, Agent, or Firm*—Schwartz, Jeffery, Schwaab, Mack, Blumenthal & Koch

[57] ABSTRACT

The present invention relates to a novel physical form of gluten to be utilized as a self-binder for meat-like products excluding the need of egg albumen. The novel physical form contains an inert material bound within its matrix and is characterized by its net-like fibrous structure, which fibers have a diameter smaller than 2 mm diameter and a viscosity of at least 50,000 cps.

The novel physical form of gluten is obtained by agitating vital wheat gluten with a reducing agent at a temperature below 70° C. and incorporating during said agitation the solid inert material having a particle size below 5 cm diameter. A preferred type of said inert material is textured vegetable protein.

The product obtained according to the invention can be successfully utilized in meat industry, enhancing the binding properties of the meat and improving its texture as an extender.

7 Claims, No Drawings

NOVEL PHYSICAL FORM OF GLUTEN, METHOD FOR ITS MANUFACTURING AND ITS USES

The present invention relates to a gluten-based self binder. More particularly the invention relates to a novel physical form of gluten to be utilized as a self-binder for meat-like products.

Gluten occurs in nature in combination with carbohydrate, lipids and minerals. Vital wheat gluten, sometimes referred to herein for convenience simply as gluten, is a concentrated natural protein in the form of a light tan powder having a bland taste and aroma. Gluten is known to consist mainly of gliadin (prolamin) and glutenin (glutelin) which are the principal cereal proteins. It is well-known in the art the method of gluten separation from wheat flour by washing. The gliadin sticks to the glutenin and prevents it from being washed out during the washing. Up to now most of the gluten is utilized in bakery industry.

It has already been suggested to utilize gluten as a basic material in various protein foods of vegetable derivation to achieve a texture which simulates that of meat and meat products. There are many references describing various methods for processing gluten and manufacturing diversified products thereof. In accordance with U.S. Pat. No. 3,290,152, a high protein uniform synthetic food product is obtained from a finely divided dehydrated vital wheat gluten and water, by a simultaneous rapid cutting of the mixture at high speed to keep the water and vital wheat gluten particles in intimate mixture. In accordance with U.S. Pat. No. 3,170,310 a fibrous high protein food product is obtained by blending a composition comprising wet gluten with defatted oil seed flour and oven setting the resulting composition. The composition contains preferably also a heat coagulable protein such as egg albumen. In accordance with the Canadian Pat. No. 848,913 meat-like wheat gluten products are obtained from gluten, alkali metal salt to adjust the pH to a range of 7 to 10, a reducing agent, water and subsequently heated to gelatinize the gluten. In order to render a fibrous texture to the gluten, known to be desirable to meat-like products, the gluten is gelatinized and elongated at the same time by its heating in boiling water. Gums with high molecular weight are claimed to be required in the boiling water in order to transform the flakes in a fibrous texture. In accordance with U.S. Pat. No. 3,840,515, the aestatic properties of grain protein are upgraded in order to render them suitable for incorporation into animal protein in foods i.e. meat.

Meat-like products are generally made from the following types of main ingredients: (1) texture ingredients; (2) fat and emulsifiers; (3) spices and flavour and (4) binders, The binder commonly used for meat analog products is egg albumen, sometimes with the addition of vegetable gums. Both egg albumen and vegetable gums are among the most expensive ingredients in the formulation and constitute a major part of the meat like product cost.

It is an object of the present invention to provide a novel physical form of gluten. It is another object of the present invention to provide a novel physical form of gluten which has self-binding properties. It is yet another object of the present invention to provide a novel physical form of gluten possessing self-binding properties to be utilized in meat-like products. The invention therefore consists in a novel physical form of gluten containing an inert material bound within its matrix, having a net-like fibrous structure which fibers have a diameter smaller than 2 mm diameter, with a viscosity of at least 50,000 cps, possessing self-binding properties, obtained by the steps of:

(a) agitating vital wheat gluten with a reducing agent at a temperature below 70° C., and (b) incorporating during said agitation the solid inert material having particles size below 5 cm diameter.

The novel physical form of gluten obtained according to the present invention has true binder-like properties and thus being particularly useful for many purposes. Fine powdered gluten, is known to be extremely hydrophilic; upon initial wetting, it hydrates, becoming a sticky elastic and tenacious rubbery mass, giving the impression to possess adhesive like properties. However it does not possess binding properties similar to those of the novel physical obtained according to the present invention.

During the first step of agitation in the presence of a reducing agent, the gluten particles are softened moderately and a net-like fibrous structure is gradually formed. This fibrous structure is subsequently stabilized by the incorporation of the solid inert material, The mechanism which will explain how the stabilization of the net-like fibrous structure occurs is not yet fully elucidiated. As known the intramolecular bonds in gluten are complex and probably many forces are in action besides hydrogen bonding and the disulphide groups. It may be assumed that after a prior reduction of the gluten, which has been found to be absolutely required in order to obtain the new gluten form, the incorporation of the inert material (i.e. textured vegetable protein) to the incipient fibrous form of gluten, contributes to the interaction which occurs between the gluten in and gliadin as a result of the difference in the electric charge, thus causing the stabilization of the net-like fibrous structure. According to a preferred embodiment of the present invention, the solid inert material added during agitation in the second step is textured vegetable protein. The novel physical form of gluten thus formed has been found to possess outstanding binding properties for the ingredients in a meat-like products, being thus capable to replace the expensive egg albumen. Furthermore, the presence of gluten improves the "meaty" structure of the final product. As known in the art, gluten has a particular advantage when present together with soya derivatives thus imparting a protein efficiency ratio which is very close to that of pure meat. When utilised in meat-like products, additional ingredients such as colouring agents, flavouring reagents and fat are generally incorporated. The artificial meat obtained can be used such as being a high quality meat analog, or as a raw material for manufacturing every kind of processed meat such as sausage, hamburger, meat spread, corned beef etc. When used without any meat additive, it has a particular advantage being completely "pareve" consisting of pure vegetable protein food which closely duplicates the nutrition, flavour, texture and appearance of meat. It can be precisely formulated to provide the required nutritional levels of protein, fat and carbohydrates.

Although the novel physical form of gluten obtained according to the present invention can replace even completely the relatively expensive egg albumen, there are cases when egg albumen may also be added but at lower levels for persisting the "meaty" bounded texture of the meat-like product, expecially after being heated.

The presence of egg albumen might also be required when high ratio of texturised vegetable protein (e.g. 10 parts) to gluten (e.g. 1 part) are utilized during the preparation of the new physical form of gluten. Generally the ratio between the gluten and the textured vegetable protein may be varied in a broad range being generally between 1 part gluten to 0.1–10 parts of textured vegetable protein and preferably between 1 part gluten to 4 parts textured vegetable protein. Beyond these ratios, the binding effect of the novel physical form of gluten diassapears.

As would appear from the Examples given in this specification, egg albumen may be completely omitted when the ratio of rehydrated wheat gluten to the inert material is 6:1. The following Table 1 summarizes the ratios utilized in the Examples versus the egg albumen added:

TABLE 1

| Rehydrated wheat gluten | Inert material (textured soy) | Egg albumen required for binding |
|---|---|---|
| 1 | 6 | 0.35 |
| 2 | 5 | 0.25 |
| 6 | 1 | 0 |

In addition to the property of the novel physical form of gluten as self-binder in analog-meat products, it has been found that it can successfully be utilized as extender for meat. Meat by itself has also some binding property for the other ingredients normally present, whereas textured vegetable protein is completely absent from this property. Thus the novel physical form according to the present invention, when utilized in meat industry will serve a two-fold purpose: enhancing the binding properties of the meat and extender of meat thus improving its texture.

According to another embodiment of the present invention, the binding properties of the novel physical form of gluten can be utilized in the manufacturing of various products such as: paper, adhesives, puddings, jelly, encapsulates and pellets, etc.

Other inert materials instead of textured vegetable protein may be utilized, provided that their particle size is not above 5 cm and preferably below 3 cm. It is also possible to start with larger particles size, their comminution to the desired size occuring during the vigorous agitation. Examples of such solid materials are: cellulosic materials, minerals, micronutrients etc.

The entire process for the manufacture of the novel physical form of gluten is very simple. Fresh gluten or rehydrated is thoroughly mixed with a solid or an aqueous solution of a reducing reagent. Examples of such reducing agents are: tocopherol, ascorbic acid, butylated hydroxyanisole, butylated hydroxytoluene, sodium sulfite, sodium bisulfite etc. An incipient fibrous structure can be observed but this completely collapse when the mixer is stopped. While continuing the vigorous agitation, a textured vegetable protein as inert material is added and the novel physical form of gluten is achieved. A typical example of textured vegetable is hydrated extruded soy flour.

While the invention has been described in connection with specific embodiments thereof, it will be understood that it is capable of further modification and this specification is intended to cover any variation, use, or adaptation of the invention, following in general the principle of the invention and including such departures from the present disclosure as come within known customary practice in the art to which the invention pertains and as may be applied to the essential features hereinbefore set forth and as fall within the scope of the invention.

The following examples are therefore given only for illustrating the invention without limiting the boundary of the invention.

EXAMPLE 1

An amount of 600 g rehydrated wheat gluten was mixed with 0.3 g of sodium sulfite. After ten minutes of vigorous agitation an amount of 100 g of rehydrated textured soy (particle size between 1 to 2 cm) was added while the agitation was continued. Additional ingredients added were: 10 g of vegetable oil, spices and flavor. The final mix was prepared as meat-like hamburger in which all ingredients were bounded in an homogeneous mass, although no egg albumen was present.

EXAMPLE 2

An amount of 100 g of rehydrated wheat gluten was mixed with 0.01 g of ascorbic acid. After about ten minutes of continuous mixing an amount of 600 g of rehydrated textured soy flour was added while the mixing continuing. The following ingredients were further incorporated: 10 g of vegetable oil, 35 g of egg albumen, spices, flavour and caramel. The final mix was prepared as meat-like steak in which all ingredients were bounded in an homogeneous mass being of an excellent quality as tested by a panel group.

EXAMPLE 3

The same procedure as described in Example 2 repeated with the exception that 200 g of rehydrated wheat gluten were mixed with 0.1 g of sodium sulfite and 500 g of rehydrated textured vegetable protein. The same amount of flavouring agents, spices and fat were added the difference being the requirement of only 25 g of egg albumen in order to obtain the same bounded homogeneous mass as in Example 2.

EXAMPLE 4

This example illustrates the utilization of the new physical form of gluten as meat extender. An amount of 300 g of rehydrated gluten was mixed with 0.2 g of sodium sulfite and after about ten minutes of continuous agitation, 400 g of hydrated textured vegetable protein were added. It was found that up to 3 parts of said gluten form to 1 part meat can be successfully utilized (as meat extender), without impairing the binding or texture properties of the mass obtained.

I claim:

1. A novel physical form of gluten containing an inert food material bound within its matrix, having a net-like fibrous structure which fibers have a diameter smaller than 2 mm diameter, with a viscosity of at least 50,000 cps., possessing self-binding properties, obtained by the steps comprising:
   (a) agitating a mixture consisting essentially of hydrated vital wheat gluten and a reducing agent at a temperature below 70° C. to form a softened, net-like fibrous structure, and
   (b) incorporating during said agitation the solid inert food material having particles size below 5 cm diameter in an amount sufficient to obtain a ratio of gluten to inert food material of from about 1:0.1 to 1:10.

2. A novel physical form of gluten according to claim 1, wherein the solid inert food material is textured vegetable protein.

3. A novel physical form of gluten according to claim 1, wherein the reducing agent used in step (a) is selected from the group consisting of tocopherol, ascorbic acid, sodium sulfite and sodium bisulfite.

4. A novel physical form of gluten according to claim 2, wherein said textured vegetable protein is rehydrated extruded soya.

5. A process for the manufacture of meat-like products comprising the incorporation of nutritionally effective amounts of coloring agents, spices and fats into the novel physical form of gluten obtained according to claim 2.

6. A process for the manufacture of meat-like products according to claim 5 further comprising a minor amount of a binder other than said gluten.

7. A process for the manufacture of meat products according to claims 5 or 6 wherein the novel physical form is incorporated in meat selected from the group consisting of sausage, hamburger, meat spread and corned beef.

* * * * *